(12) United States Patent
Montbach et al.

(10) Patent No.: US 9,235,096 B2
(45) Date of Patent: Jan. 12, 2016

(54) INDUCTIVE SWITCHING OF CHOLESTERIC LIQUID CRYSTAL DISPLAY DEVICE

(71) Applicant: Kent Displays Incorporated, Kent, OH (US)

(72) Inventors: Erica N. Montbach, Kent, OH (US); Mark Lightfoot, Sterling, OH (US); J. William Doane, Kent, OH (US)

(73) Assignee: KENT DISPLAYS INCORPORATED, Kent, OH (US)

( * ) Notice: Subject to any disclaimer, the term of this patent is extended or adjusted under 35 U.S.C. 154(b) by 54 days.

(21) Appl. No.: 13/975,692

(22) Filed: Aug. 26, 2013

(65) Prior Publication Data

US 2015/0054775 A1 Feb. 26, 2015

(51) Int. Cl.
 *G09G 3/00* (2006.01)
 *G02F 1/137* (2006.01)
 *G09G 3/36* (2006.01)

(52) U.S. Cl.
 CPC .......... *G02F 1/13718* (2013.01); *G09G 3/3629* (2013.01)

(58) Field of Classification Search
 CPC .................................................. G09G 3/3629
 USPC ........................................ 345/89, 211; 349/12
 See application file for complete search history.

(56) References Cited

U.S. PATENT DOCUMENTS

| | | | |
|---|---|---|---|
| 5,437,811 A | 8/1995 | Doane et al. | |
| 5,453,863 A | 9/1995 | West et al. | |
| 5,493,430 A | 2/1996 | Lu et al. | |
| 5,644,330 A | 7/1997 | Catchpole et al. | |
| 5,889,566 A | 3/1999 | Wu et al. | |
| 6,104,448 A | 8/2000 | Doane et al. | |
| 8,139,039 B2 | 3/2012 | Schneider et al. | |
| 8,228,301 B2 | 7/2012 | Schneider | |
| 2006/0209060 A1* | 9/2006 | Tanada et al. | 345/211 |
| 2010/0265214 A1* | 10/2010 | Green et al. | 345/174 |
| 2011/0090412 A1* | 4/2011 | Mori et al. | 349/12 |
| 2012/0074944 A1* | 3/2012 | Leussler | 324/322 |
| 2013/0070184 A1 | 3/2013 | Morris et al. | |

* cited by examiner

*Primary Examiner* — Amare Mengistu
*Assistant Examiner* — Joseph G Rodriguez
(74) *Attorney, Agent, or Firm* — Pearne & Gordon LLP

(57) ABSTRACT

A system including a cholesteric liquid crystal (ChLC) display device and an erasing device. The display device (e.g., a writing tablet, liquid crystal paper) is inductively coupled to the erasing device for inductively erasing an image on the display device. Also featured is a ChLC display device that can be inductively erased.

8 Claims, 3 Drawing Sheets

INDUCTIVE SWITCHING OF CHOLESTERIC LIQUID CRYSTAL DISPLAY DEVICE

TECHNICAL FIELD

This disclosure relates generally to a writing/drawing tablet or surface utilizing a pressure sensitive display. In general, Bistable Liquid Crystal Displays (BLCD), and, in particular, Cholesteric Liquid Crystal Displays (ChLCDs) create low cost pressure sensitive displays that are efficient power consumers and that can be utilized in a number of unique devices such as a tablet or paper replacement.

BACKGROUND OF THE INVENTION

Recently, the pressure sensitive cholesteric liquid crystal (ChLC) writing tablet, Improv Electronics® Boogie Board® LCD eWriter, has appeared on the market in which a pointed stylus or the finger can be used to write or trace an image on the surface of the tablet as described in U.S. Pat. No. 6,104,448, which is incorporated herein by reference in its entirety. (Improv Electronics® is a unit of Kent Displays, Inc.) This tablet offers a considerable improvement over previous tablet technologies in that the image can be simply and instantly erased with the push of a button that applies a voltage pulse to electrodes in the tablet. In a ChLC writing tablet, the liquid crystal is sandwiched between two substrates, each having an electrode, which are spaced to a particular gap. The upper substrate is flexible and the bottom substrate is painted with an opaque light absorbing background. Within the gap is a bistable ChLC dispersed in a polymer. This material can exhibit two textures, an essentially transparent (focal conic) texture and a color reflective (planar) texture. The spacing of the cell gap is usually set by plastic or glass spacers that are either cylindrical or spherical in shape. The tablet is initialized by applying voltage pulses to the electrodes to electrically drive the cholesteric material to the generally transparent texture. When one presses on the top substrate with a point stylus or finger, the liquid crystal is locally displaced. Flow induced in the liquid crystal changes its optical texture from generally transparent to a brilliant reflective color at the location of the stylus. The reflective color contrasts well with the dark background of the lower substrate. An image traced by the stylus or finger will remain on the tablet indefinitely without application of a voltage until erased. Erasure is accomplished by applying a voltage pulse to the transparent conducting electrodes on the inner surface of the substrates that drive the ChLC from its color reflective state back to its generally transparent state.

The above described principle is disclosed in more detail in U.S. Pat. No. 6,104,448, which is incorporated herein by reference in its entirety. Polymer dispersions can be used to control the pressure sensitivity and resolution of the image as described in U.S. Pat. No. 8,228,301, which is incorporated herein by reference in its entirety. Other modes of operation and a tablet for multiple color images are described in this patent and a means for select erase is disclosed in U.S. Pat. No. 8,139,039, which is incorporated herein by reference in its entirety. One mode of operation different from that described above is one in which the tablet is initialized by electrically driving the tablet display to the color reflective texture with a voltage pulse or pulses. Then with a continuous voltage applied to the electrodes of an appropriate value, one can write images by driving the cholesteric material to the generally transparent texture with the pressure of a pointed stylus. This mode of operation with a color reflective background is termed "Mode A" and the other mode with a generally light absorbing dark background is termed "Mode B." Mixed modes are also possible.

The commercial Boogie Board® writing tablet, operated in Mode B, has the color black for the fixed opaque light absorbing background. The dark black background offers high contrast for the color reflective image written on the tablet. As disclosed in U.S. Pat. No. 5,493,430, which is incorporated herein by reference in its entirety, other opaque colors may also be used for the fixed background of a ChLC display. The color of the background additively mixes with the reflective color to present a different color than that of the ChLC. There may be multiple colors on the background and those colors may be patterned. As an example, the pattern could be lines offering a lined tablet for convenience in writing text similar to a ruled paper tablet.

The Boogie Board® tablet contains the electronics used to erase the tablet. There are other devices such as Liquid Crystal Paper (see U.S. patent application Ser. No. 13/621,367, which is incorporated herein by reference in its entirety) that possess no such electronics. The paper is erased by removably attaching it to external electronic circuitry when it is desired to erase images that have been drawn on its surface. Like normal writing paper, liquid crystal paper is a thin, flexible sheet. One uses liquid crystal paper in the same way normal writing paper is used for handwriting or drawing pictures. An untethered, pointed stylus is used to write on the liquid crystal paper but with the advantage that it does not have to be a pencil or pen but only a pointed object which could even be one's fingernail. For example, the stylus could be comprised of polymer and contain no lead or ink. Like normal writing paper, liquid crystal paper is placed on a hard surface for writing. Erasing liquid crystal paper requires that temporary electrical contact is made with an external circuit in order to provide voltage pulses suitable for clearing it. This might be inconvenient to the user. Likewise only one sheet can be erased at a time.

What would be desired but has not yet even been contemplated to our knowledge, would be a device that would, upon command, erase the liquid crystal paper or ChLC writing tablet at a distance, or in an otherwise electrically isolated manner without direct electrical contact of the electrodes to an erasing circuit. Such a device would not require picking up the paper and connecting it to the erasing device. Further, more than one sheet could be erased at a time. We disclose here such a device.

BRIEF DESCRIPTION

Disclosed is an inductive device and method for erasing a pressure sensitive ChLC device. When a ChLC writing tablet is operated in Mode B no voltage is applied to the electrodes; the pressure of the pointed stylus drives the ChLC to the reflective planar texture displaying the written image. Electric power is required to erase the image; however, the power required to drive the material to the focal conic texture is small, clearing the written image, as described in the background art above. Because of this feature, we found that a tablet connected to a secondary induction coil could be erased at a distance with an external device containing a primary induction coil generating a pulsed magnetic field with the desired waveform. The efficiency of the induction erasing mechanism; that is, the distance the external driving device is removed from the writing tablet as well as the size of the tablet depends on additional circuitry attached to the secondary induction coil.

Several aspects and embodiments are disclosed. One aspect is the use of this erase mechanism for liquid crystal paper. Liquid crystal paper with no erase mechanism needs to be temporarily electrically connected to a separate erase circuit. The electrodes on a sheet of paper must be made in direct electrical contact with the electrodes of the erasing circuit providing the voltage waveforms. This is delicate and cumbersome and the connectors can become worn and more difficult to make contact as the paper is repeatedly used. The inductive method of this disclosure, on the other hand, requires no delicate handling of the paper and it is simply erased at a distance by pushing a button on the external erase device which applies power to a primary coil and associated electronics. Furthermore, more than one sheet of liquid crystal paper can be erased at once.

A first embodiment features a system comprising a cholesteric liquid crystal display device and an erasing device. The display device is inductively coupled to the erasing device for inductively erasing an image on the display device.

Referring to specific features of the first embodiment, the erasing device can include a primary coil electrically connected to first associated electronics. The first associated electronics can include a first capacitor attached to a waveform generator, the first capacitor being in parallel with the primary coil. The erasing device provides a voltage for erasing the image on the display device. The display device can include a secondary coil with optional second associated electronics. The second associated electronics can include a second capacitor; the second capacitor is in parallel with the secondary coil. In all features of the first embodiment the display device can be a writing tablet (e.g., a Boogie Board® or Rip® writing tablet) or liquid crystal paper.

Further, the first capacitor and primary coil can form a first resonant circuit, and the second capacitor and the secondary coil can form a second resonant circuit; and wherein a resonant frequency of the first resonant circuit and a resonant frequency of the second resonant are substantially equal to a frequency of the voltage provided by said waveform generator.

In another aspect, the first capacitor and the primary coil form a first resonant circuit, and the second capacitor and the secondary coil form a second resonant circuit; and wherein a resonant frequency of the first resonant circuit and a resonant frequency of the second resonant are substantially equal to an erasing frequency of the voltage.

Moreover, the display device can comprise display electrically conductive layers disposed on either side of a cholesteric liquid crystal (ChLC) layer, substrates that sandwich the ChLC layer and the display electrically conductive layers between the substrates, and electrical conductors that interconnect the secondary coil and the optional associated electronics with the display electrically conductive layers, wherein the voltage is applied from the primary coil to the secondary coil.

Still further, the secondary coil can include a printed conductive film on one of the substrates. In all features of the first embodiment the erasing device need not physically contact the display device (e.g., writing tablet or liquid crystal paper) during the inductive coupling.

All of the specific features described above, and all features described in the Detailed Description, can apply to the first embodiment in any combination.

A second embodiment features a cholesteric liquid crystal display device comprising a coil with optional associated electronics that inductively receive a voltage that erases an image on the display device.

Referring to specific features of the second embodiment the associated electronics can include a capacitor; the capacitor is in parallel with the coil. In all features of the second embodiment the cholesteric liquid crystal display device can be liquid crystal paper or a writing tablet, for example, a Boogie Board® or Rip® writing tablet. The coil can include a printed conductive film on one of the substrates.

Still further, the writing tablet or liquid crystal paper can comprise display electrically conductive layers disposed on either side of a cholesteric liquid crystal (ChLC) layer, substrates that sandwich the ChLC layer and the display electrically conductive layers between the substrates and electrical conductors that interconnect the coil and the optional associated electronics with the display electrically conductive layers.

All of the specific features described above relating to the first and second embodiments, and all features described in the Detailed Description, can apply to the second embodiment in any combination.

It should be appreciated that reference to an image on the cholesteric liquid crystal display device includes any drawing or writing.

Many additional features, advantages and a fuller understanding of the embodiments of the disclosure will be had from the accompanying drawings and the detailed description that follows. It should be understood that the above Brief Description describes embodiments of the disclosure in broad terms while the following Detailed Description describes embodiments of the disclosure more narrowly and presents specific embodiments that should not be construed as necessary limitations of the invention as broadly defined in the claims.

BRIEF DESCRIPTION OF THE DRAWINGS

It should be appreciated that like reference numerals indicate the same or similar parts throughout the drawings.

DETAILED DESCRIPTION

Figure 1:
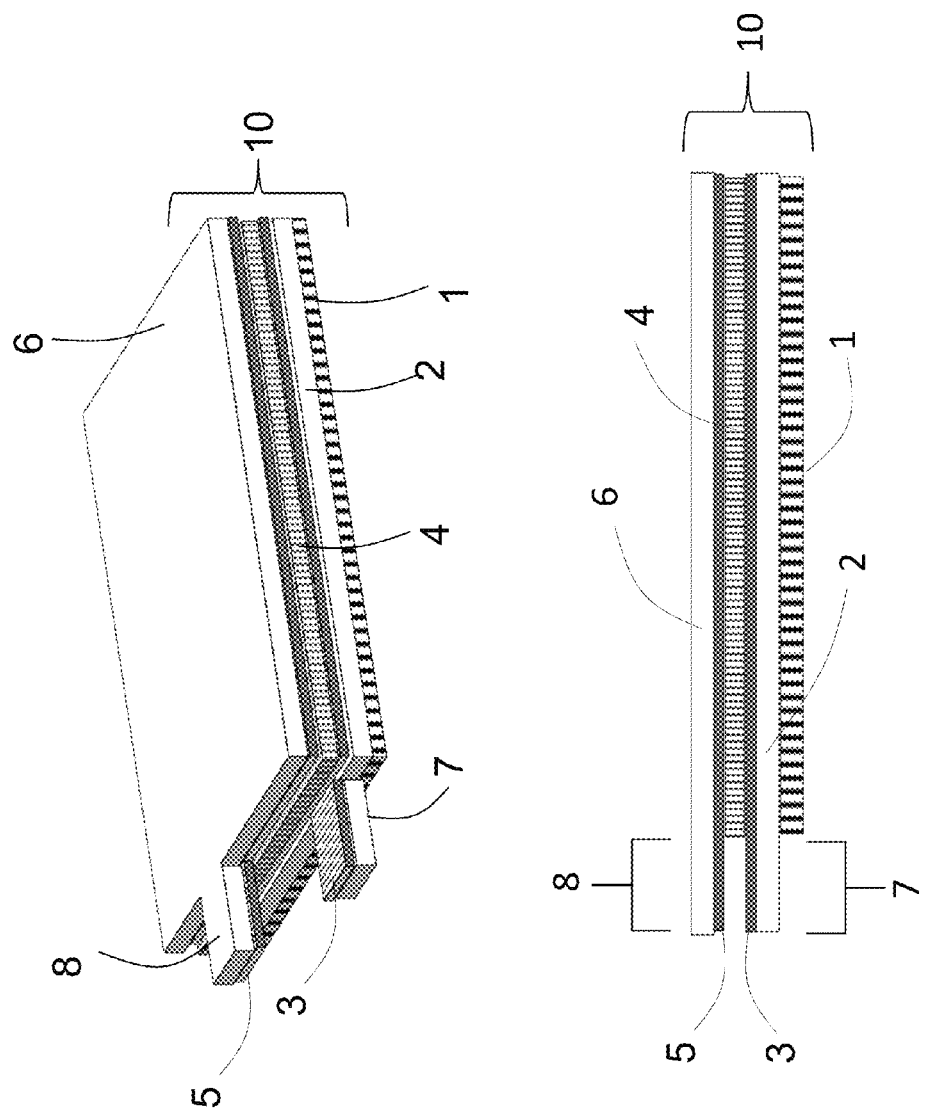
FIG. 1: Illustration showing components of a flexible cholesteric liquid crystal display device (e.g., writing tablet display) suitable for use in this disclosure.

In a cholesteric display of the prior art such as the Boogie Board® writing tablet typical integrated drive electronics are used to erase the written image to the focal conic texture. FIG. 1 is an illustration of the components of a Cholesteric Liquid Crystal (ChLC) Display Device 10, for example, liquid crystal paper or a ChLC writing tablet without the drive electronics, suitable for use in the system S of this disclosure discussed below. Referring to FIG. 1, an opaque coating 1 is placed on the bottom transparent plastic substrate 2 that is coated on its other surface with a transparent electrically conductive layer 3. The remainder of the display includes a layer 4 of a cured dispersion of liquid crystal, polymer and spacers, and another transparent top substrate 6 coated with a transparent electrical conductor 5. The bottom and top substrates are extended to create the bottom ledge 7 and top ledge 8. The transparent conductive layers 3 and 5 are exposed on the ledges 7 and 8, respectively, for connecting to drive electronics so that a voltage or voltage pulses may be applied across electrically conductive layers 3 and 5 as is suitable to initialize or erase an image or operate the display in Mode A, Mode B or select erase as described in U.S. Pat. Nos. 8,228, 301 and 8,139,039, which are incorporated herein by reference in their entireties.

Drawbacks of prior art ChLC writing tablets such as the Boogie Board® include the necessity of electronic erase circuitry with a battery and other components which add to the cost of the device not to mention the added labor in constructing the product. Other drawbacks which are recognized in this disclosure, include electronic paper where the inability to drive multiple displays with one set of external electronics and the inability to omit an external voltage source that is in electrical contact with the display. For example, it would be desirable to have several liquid crystal papers that can be erased without being in physical electrical contact with the drive electronics, since repeated electrical connection can wear and damage connection points. As another example, in children's toys it would be desirable to have a device with no batteries to avoid batteries being unsafely removed by a child.

Figure 2:
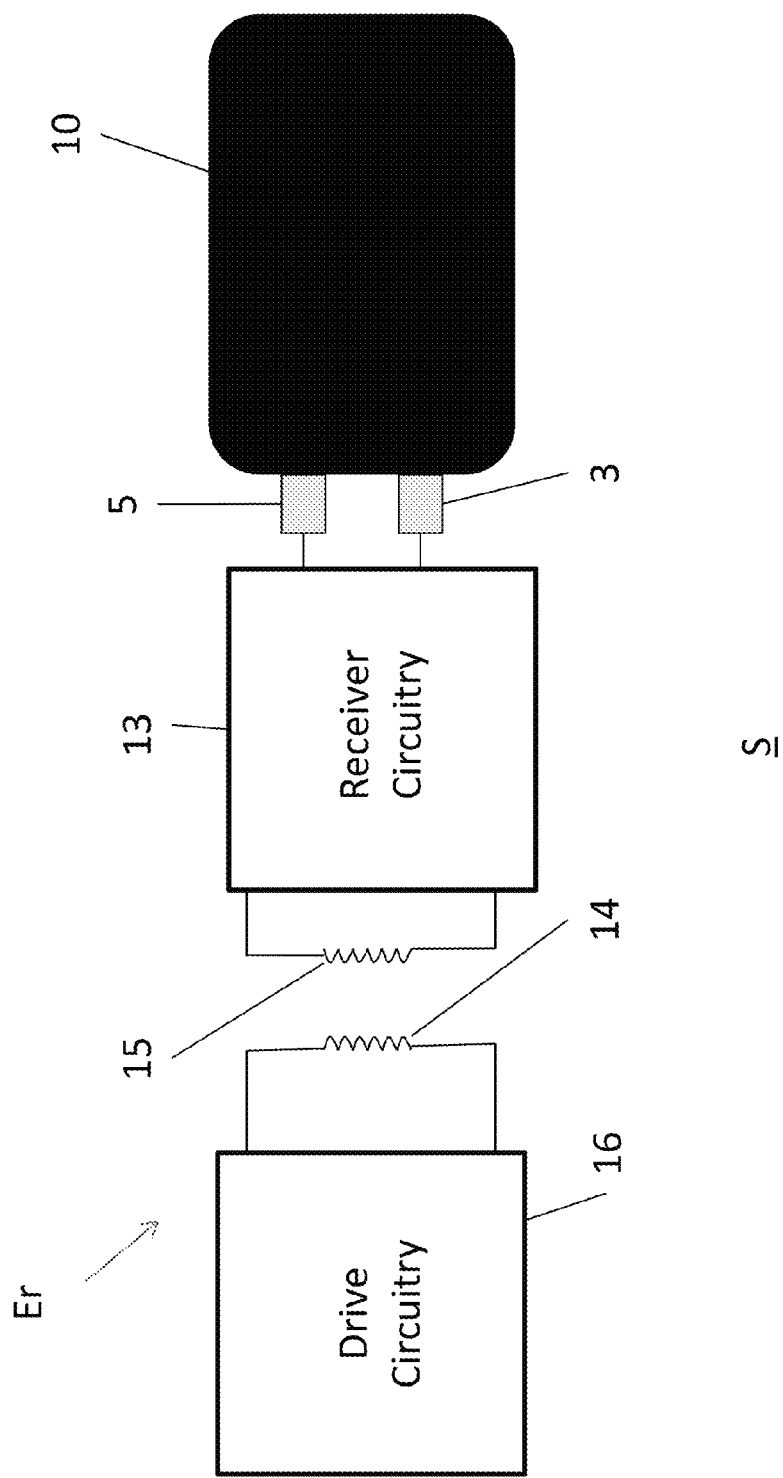
FIG. 2: Generalized circuit diagram of a system including the cholesteric liquid crystal display device of FIG. 1 and an erasing device that inductively erases the display device.

Referring to FIG. 2, disclosed is the system S including an erasing device Er and the Liquid Crystal Display Device 10. The Display Device 10 is, for example, a writing tablet or electronic liquid crystal paper, and includes inductive switching electronics for wirelessly coupling the Display Device to matching drive circuitry of the erasing device Er, to inductively switch the display and erase it. Referring to FIG. 2, the Liquid Crystal Display 10 is, for example, a pressure sensitive writing device such as disclosed in U.S. patent application Ser. No. 13/621,367, which is incorporated herein by reference in its entirety. An image or writing can be made on the surface of the device with the pressure of the pointed stylus. Electrodes 3 and 5 are used to erase the device and are connected to the Receiver Circuitry 13 to be described later. A Secondary Induction Coil 15 provides an induced voltage to the Receiver Circuitry 13 for the purposes of erasing the image on the Display 10. The separate erasing device Er includes Drive Circuitry 16 and the associated Primary Induction Coil 14. Drive Circuitry 16 provides an AC pulse waveform to the Primary Induction Coil for inducing a voltage in the Secondary Induction Coil of a voltage, such as described in U.S. Pat. Nos. 5,453,863 or 5,437,811, which are both incorporated herein by reference in their entireties, that is able to drive a ChLCD from the planar texture to the focal conic texture, or vice versa. Voltage waveforms including bipolar waveforms and unipolar waveforms can be found in U.S. Pat. Nos. 5,644,330 or 5,889,566 respectively, which are incorporated herein by reference in their entireties. It should be appreciated that this is only a representative design in FIGS. 1-3; the ledges 7, 8 could be internal ledges as disclosed in U.S. patent application Ser. No. 13/754,481, which is incorporated herein by reference in its entirety, and the secondary coil and associated electronics could be formed on one of the substrates of the writing tablet, for example, in the case of liquid crystal paper.

The purpose of the Receiver Circuitry 13 is to efficiently couple the Secondary Induction Coil 15 to the Display Device 10. Electronically, Display 10 can be considered basically equivalent to a large area parallel plate capacitor with a narrow gap filled with a high dielectric constant liquid crystal. On either side of the liquid crystal material is an electrically conductive layer or conductive plate. The electrically conductive layer can include a conducting polymer. The resistance of the transparent conductive layers is typically 500 Ω/□ and can go much higher. The equivalent circuit of Display 10 is therefore a capacitor in series with a resistor. Receiver Circuitry 13 is therefore designed for efficient energy transfer between the Primary Induction Coil 14 and Secondary Induction Coil 15 for driving Display 10.

Figure 3:
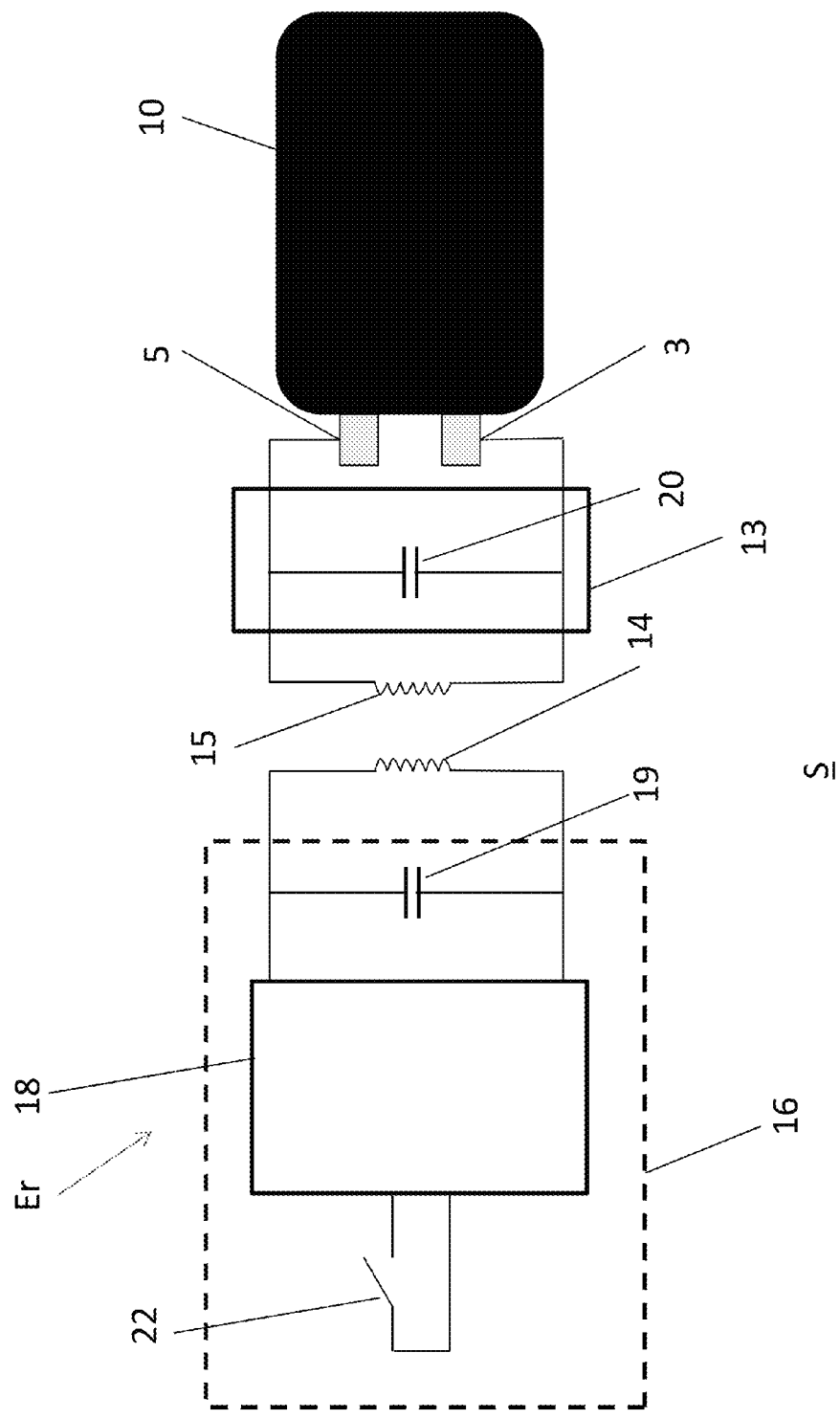
FIG. 3: Simple circuit diagram with example drive and receiver circuitry for inductive erase.

Referring to FIG. 3, a simple example of Receiver Circuitry 13 is a Capacitor 20; the Capacitor 20 is in parallel with the Secondary Induction Coil 15 and the value of the Capacitor 20 is selected to provide a resonant frequency that approximately matches that of the AC signal used for erasing the image. For example, the Secondary Induction Coil 15 and the Capacitor 20 form a resonant circuit, and the resonant frequency of the resonant circuit substantially equals the frequency of the voltage picked up by the Secondary Induction Coil 15 from the Primary Induction Coil 14. If AC or DC pulses are used, the resonant frequency can be selected to match the largest Fourier component of the resulting waveform used for erasing the display image. The rather large resistance of the transparent electrically conductive layer 3 and 5 serves to at least partially isolate the capacitance of the display from the capacitance of the Capacitor 20 used for Receiver Circuitry 13. In some cases, additional electrical components and circuitry may be added to the Receiver Circuitry 13 to provide a more efficient drive. In addition, the Drive Circuitry 16 includes a Waveform Generator 18 electrically connected to a Capacitor 19, the capacitor being in parallel with the Primary Induction Coil 14. An erasing pulse sequence from the waveform generator is activated by erasing switch 22. The electrical components are electrically connected with electrical conductors to form the circuitry shown. The erasing pulse sequence used to erase a written image on the display is of the type used to drive the cholesteric liquid crystal to the focal conic state such as described in U.S. Pat. Nos. 5,644,330 or 5,889,566, which are incorporated herein by reference in their entireties. Once again, the capacitor 19 and capacitor 20 are selected for efficient energy transfer. The values of capacitor 19 and the induction coil 14 of the primary circuit as well as capacitor 20 and induction coil 15 of the secondary circuit are each selected to form a resonant circuit. The resonant frequency of the primary and secondary circuit are matched and substantially equal the frequency of the AC voltage pulses provided by the waveform generator 18.

It is to be appreciated that the erasing device Er that includes the Drive Circuitry 16 and the Primary Coil 14 is a physically separate device from the Receiver Circuitry 13 and the Secondary Coil 15 that are electrically connected with electrical conductors to the electrodes 3, 5 of the Display 10 (see FIGS. 2 and 3). To erase the Display 10, the Display is brought within an operational range (e.g., moved near or placed on top of) the Primary Induction Coil 14, to wirelessly and inductively pick up a voltage signal from the Drive Circuitry 16. Together, the Primary Induction Coil 14 and the Secondary Induction Coil 15 form an air core transformer for transferring electrical energy from the Drive Circuitry 16 to the Receiver Circuitry 13. In an example embodiment, the Primary Induction Coil 14 and the Secondary Induction Coil 15 are each inductors comprising a series of wound turns. The secondary coil, for example, can be wound around the outer perimeter of the display. The coil can further be printed on the outer perimeter of one of the substrates of the display instead of using wires. The coil can be formed by printing a conducting material or may be formed by etching a conducting material on the perimeter of the substrate.

The waveform generator 18 supplies a waveform of AC pulses to the Primary Induction Coil 14 for erasing the Display 10. The Drive Circuitry 16, and thus the waveform generator 18, can receive electrical power from various sources (not shown), such as a commercial AC power source, batteries, photovoltaic cells, etc. To generate the AC pulses, the waveform generator 18 can include waveform generation circuitry for generating a voltage signal of a desired frequency and amplitude. Such waveform generation circuitry can include inverters and/or oscillators, for example. In certain embodiments, the waveform generation circuitry includes controlled switches, such as transistors, for switching on and off at desired frequencies under the control of appropriate control circuitry. In further embodiments, the waveform generator can include a synthesizer or a function generator to generate the AC waveform or DC pulses.

EXAMPLES

Example 1

A 3"×1.5" Writing Tablet display was inductively switched with a circuit similar to that shown in FIG. 3. The writing tablet display was one used in a commercial Improv Electronics Boogie Board LCD eWriter that may be obtained by disassembling a commercial Boogie Board®. The size of the display was achieved by trimming off a 1.5 inch segment from the top of the commercial display, leaving the factory-made ledges intact. An image was put on the display with the pressure of a pointed stylus in the usual manner. We found that the image on the display could be erased at a distance by use of an Analogic Polynomial Waveform Synthesizer 2020 function generator and a Kepco BOP200-1M amplifier connected to a 94 nF capacitor in parallel with a 485 μH primary coil with a height of 0.25", consisting of 50 turns in a circle with a diameter of 3", using AWG30 wire. A secondary coil 15 (identical to the primary coil) was connected, in parallel, to a 94 nF capacitor and the 3"×1.5" Writing Tablet display. The 10 kHz waveform with a $V_{rms}$=9V and $V_{P-P}$=45V applied over a period of 2000 milliseconds sufficiently switched the entire Writing Tablet display to the focal conic state erasing the image from the display.

Example 2

A 7.5"×5" Writing Tablet display from a commercial Improv Electronics® Boogie Board® LCD eWriter was inductively switched with a circuit similar to that shown in FIG. 3. In this example, a full size display was used without reducing its size. An Analogic Polynomial Waveform Synthesizer 2020 function generator and Kepco BOP200-1M amplifier were used to apply a waveform to a 5.28 μg capacitor in parallel with a 4.13 mH primary coil with a height of 0.19", consisting of 180 turns in a circle with a diameter of 3.5" and a depth of 1.25", using AWG26 wire. The secondary coil has an inductance of 2.5 mH and a height of 0.38". It consists of 100 turns wound in a circle with a 4.25" diameter using 26AWG wire and was connected, in parallel, to a 5.28 μg capacitor 13 and the 7.5"×5" Writing Tablet display. With an image placed on the tablet display, a 1.2 kHz waveform with a $V_{rms}$=28V and $V_{P-P}$=77V was found to sufficiently switch the Writing Tablet display to the focal conic state, thereby erasing the image.

Many modifications and variations of the disclosed embodiments will be apparent to those of ordinary skill in the art in light of the foregoing disclosure. Therefore, it is to be understood that, within the scope of the appended claims, the invention can be practiced otherwise than has been specifically shown and described.

What is claimed is:

1. A system comprising: a writing tablet including a cholesteric liquid crystal layer on which applied pressure changes reflectance of the liquid crystal and forms an image, an erasing device, wherein said writing tablet is inductively coupled to said erasing device, and said erasing device provides voltage pulses that induce voltage pulses that erase the image on said writing tablet, wherein said erasing device includes a primary coil electrically connected in parallel with a first capacitor and attached to a waveform generator, and wherein said writing tablet includes a secondary coil.

2. The system of claim 1, comprising associated electronics, wherein said associated electronics includes a second capacitor, said second capacitor being in parallel with said secondary coil.

3. The system of claim 2 wherein said first capacitor and said primary coil form a first resonant circuit, and said second capacitor and said secondary coil form a second resonant circuit, and wherein a resonant frequency of the first resonant circuit and a resonant frequency of the second resonant circuit are substantially equal to a frequency of said voltage pulses provided by said waveform generator.

4. The system of claim 2 wherein said writing tablet comprises display electrically conductive layers disposed on either side of said cholesteric liquid crystal layer, substrates that sandwich said cholesteric liquid crystal layer and said display electrically conductive layers between said substrates, and electrical conductors that interconnect said secondary coil and said associated electronics with said display electrically conductive layers, wherein said voltage pulses are applied from said primary coil to said secondary coil.

5. The system of claim 4 wherein said secondary coil includes a printed conductive film on one of said substrates.

6. The system of claim 1 wherein said erasing device does not physically contact said writing tablet during said inductive coupling.

7. The system of claim 1 wherein said induced voltage pulses are AC voltage pulses that have an amplitude and frequency that result in said erasing of said writing tablet such that a reflective said image on said writing tablet is changed to an essentially transparent focal conic texture.

8. The system of claim 1 wherein said voltage pulses and said induced voltage pulses are AC voltage pulses.

* * * * *